Dec. 10, 1968                J. FARRELL                3,415,056
                          AIR PURIFICATION UNIT
                          Filed Dec. 27, 1966
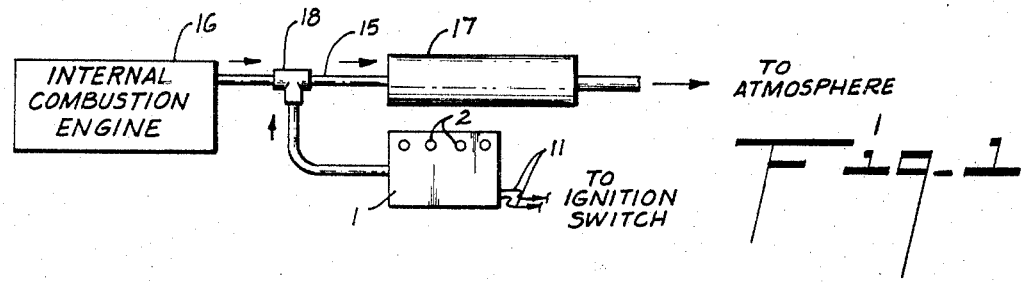
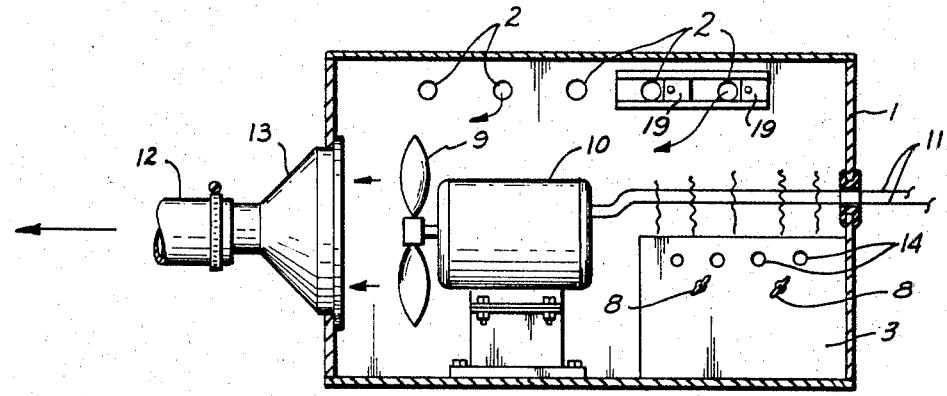
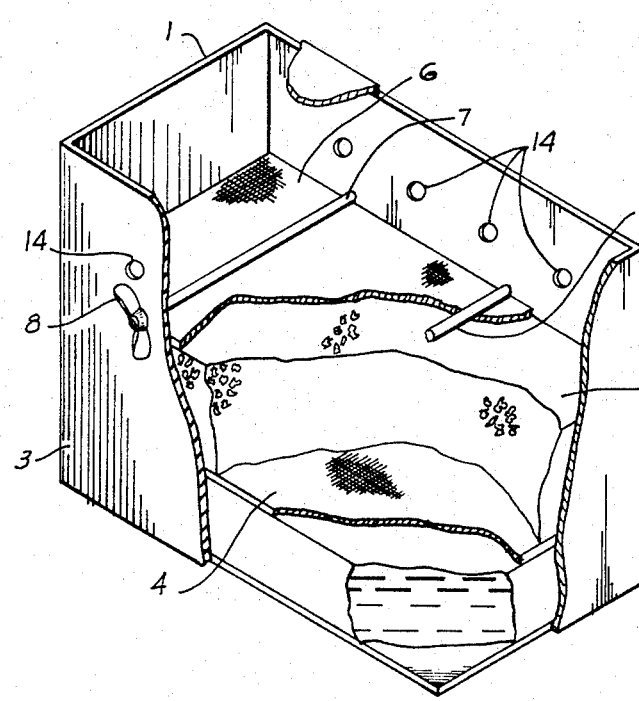
JOHN FARRELL
INVENTOR.
BY *Ramulus O. Wyatt*
ATTORNEY United States Patent Office 3,415,056
Patented Dec. 10, 1968

3,415,056
AIR PURIFICATION UNIT
John Farrell, 5320 Beverly Hills Lane,
Houston, Tex. 77027
Filed Dec. 27, 1966, Ser. No. 604,730
5 Claims. (Cl. 60—30)

ABSTRACT OF THE DISCLOSURE

An apparatus for introducing the fumes from a neutralizing chemical into the exhaust stream of noxious gases with the amount of chemical dispensed into the exhaust stream being controlled by filtering the evaporating fumes thereof through a sponge, such as a cellular block of polyurethane foam.

Background of the invention

With the increased use of combustion engines in vehicles and the exhausting of noxious gases into the atmosphere by industry, air purification is becoming a real problem, and one method of combating this problem is to prevent contamination of the air from the primary offenders. Vehicles contribute a great deal to the problem through the noxious gases from the exhaust systems thereof. Chemicals have been found that will neutralize most of the offensive exhaust gases, reducing same to harmless vapors. The difficulty with the use of such chemicals is economic. Their usefulness is dependent upon finding a simple and inexpensive mechanical means of employing them in treating exhaust gases before such gases are released into the ambient atmosphere.

Summary of the invention

In order to economically dispense the neutralizing chemical, applicant has designed a means for confining the chemical in a supply reservoir, and the fumes from the evaporation of such chemical are forced into the stream of exhaust from the source of such noxious gases. The volume of chemical introduced into the stream of exhaust gas is controlled by a block of polyurethane foam, which restricts the flow of fumes from the tank in accordance with the thickness of the block and the density of the cellular structure.

Brief description of the drawing

FIGURE 1 is a diagrammatic plan view of the device installed in the exhaust system of a vehicle having a combustion engine.

FIGURE 2 is an enlarged side elevational view, partially in cross section, of the means for generating chemical fumes and moving same into the exhaust stream, and FIGURE 3 is an enlarged perspective view, partially in cross section, illustrating the chemical tank and fumes control means employed.

Description of the preferred embodiment

In the drawings the numeral 1 designates a housing of the desired dimensions, having ports 2, 2 formed in the side walls adjacent the top margins of the housing. A removable cover 3 closes the housing 2. Mounted on the frame of the housing 1 is the supply tank 3 in which is mounted the screen 4, which is welded or otherwise secured to the inside wall surface of the tank, a spaced distance above the floor of the tank, to provide room for a supply of liquid chemical. A sponge, as 5, of any suitable cellular material, such as articulated cellular foam polyurethane, is mounted on the screen 4 and a top screen 6 is positioned on the top surface of the sponge 5 and is maintained in position by the bolts and wing nuts 7, 8 mounted in the side walls of the tank 3 and extending laterally through the tank.

Mounted on the floor of the housing 1 is the fan 9 and its motor 10 which are powered through the conduits 11 leading to the ignition key conduit (not shown) of the vehicle. A tubular conduit 12 is fastened to the discharge conduit 13 mounted in the housing 1. A series of ports 14, 14 are formed in the side walls of the tank 3. The conduit 12 leads to the exhaust conduit 15 connecting the combustion engine 16 with the exhaust muffler 17, and is connected into the conduit 15 by means of the connecting T 18. Suitable control means, such as the manually controlled dampers 19, 19 are mounted on the inside walls of the housing 1 over the ports 2, 2 for controlling the flow of air into the housing 1, to predetermine the volume of air flowing through the system. Where a stationary exhaust system is being treated, this control may be accomplished by the size of the ports 2, 2. Where the exhaust system of moving vehicles are being treated, it is necessary to manually adjust these dampers 19, 19 to restrict the volume of air moving through said housing 1.

When the ignition key of the vehicle is turned to "on" position, the motor 10 is activated and the fan 9 actuated to drive a supply of air through the conduit 12 into the exhaust conduit 15 of the vehicle. A neutralizing liquid chemical is placed in the tank 3, and fumes therefrom rise upwardly through the screen 4, sponge 5, and screen 6, to be carried by the air current generated by the fan 9 in to the exhaust system of the vehicle in the intake side of the muffler, where it will blend with and neutralize the exhaust gases. When it is necessary to refill the tank 3, the nuts 8 may be removed and the bolts 7 withdrawn from the tank 3 and the screen 6 and sponge 5 raised out of the tank 3 and a new supply of chemical poured into the tank 3, and the sponge 5 and screen 6 replaced, and secured in position by the bolts 7, 7 and 8, 8.

It is apparent that a similar apparatus may be employed for introducing a chemical fume into the stream of exhaust gases from a furnace, or the like, to apply the invention to industrial offenders, now guilty of air pollution.

While the foregoing is considered a preferred form of the invention, it is by way of illustration only, the broad scope of the invention being defined by the appended claims.

I claim:
1. In an air purification unit for treating a stream of exhaust combustion gases of a motor vehicle a housing mounted on said vehicle, a tank within said housing, a neutralizing liquid chemical in said tank, means for retaining the chemical and for restricting the flow of fumes from said chemical into said housing and means for dispensing said fumes from said housing into the said stream of exhaust combustion gases from the motor of said vehicle.
2. The device defined in claim 1 wherein the means for restricting the flow of fumes from said chemical consist of a screen mounted in said tank, a cellular sponge on said screen and another screen releasably maintained over said sponge.
3. The device defined in claim 1 for use on a motor vehicle wherein the means for dispensing the fumes from said chemical consists of a fan having an electric motor activated by the electric power of the vehicle when the ignition switch thereof is in the on position, and a tubular conduit leading from the interior of said housing to the exhaust system of said vehicle for conveying fumes from said housing into the stream of exhaust gases from the vehicle motor.

4. The device defined in claim 1 wherein said tank is provided with ports through which air may be drawn to cause a circulation of fumes, and said housing is provided with ports through which air may be drawn to provide carrying means for the fumes generated in said tank.

5. The device defined in claim 1 wherein said tank is provided with ports through which air may be drawn to cause circulation of fumes and said housing is provided with ports through which air may be drawn to provide carrying means for the fumes generated in said tank and manually adjustable dampers are provided for said last mentioned ports to control the volume of air passing through said housing.

References Cited

UNITED STATES PATENTS

| | | |
|---|---|---|
| 1,079,935 | 12/1913 | Drake. |
| 2,384,016 | 9/1945 | Dishner _____ 261—99 X |
| 2,932,364 | 4/1960 | Bintner. |
| 3,092,442 | 6/1963 | Shoemaker. |

CARLTON R. CROYLE, *Primary Examiner.*

U.S. Cl. X.R.

261—99, 100